(12) United States Patent
Smith et al.

(10) Patent No.: US 10,537,002 B2
(45) Date of Patent: Jan. 14, 2020

(54) SYSTEM AND METHOD TO IDENTIFY SHORT CIRCUITING CURRENT AND OPEN CIRCUITS IN A SEMICONDUCTOR LIGHT MATRIX

(71) Applicant: Phoseon Technology, Inc., Hillsboro, OR (US)

(72) Inventors: Jeff A. Smith, Hillsboro, OR (US); Edward A. Kiyoi, Tigard, OR (US); Ken McAllister, Beaverton, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 40 days.

(21) Appl. No.: 15/637,827

(22) Filed: Jun. 29, 2017

(65) Prior Publication Data

US 2019/0008007 A1 Jan. 3, 2019

(51) Int. Cl.
*H05B 33/08* (2006.01)
*B01J 19/12* (2006.01)

(52) U.S. Cl.
CPC .......... *H05B 33/083* (2013.01); *B01J 19/122* (2013.01); *H05B 33/089* (2013.01); *B01J 2219/1203* (2013.01)

(58) Field of Classification Search
CPC ............ H05B 33/0803; H05B 33/0815; H05B 33/0845; H05B 33/089; H05B 37/0245; H05B 37/03; H05B 37/036; B01J 2219/1203; B01J 19/122
USPC ................................................ 315/291, 121
See application file for complete search history.

(56) References Cited

U.S. PATENT DOCUMENTS

| | | | |
|---|---|---|---|
| 2005/0174420 A1* | 8/2005 | Hayashi | H05B 33/0815 347/130 |
| 2005/0206529 A1* | 9/2005 | St.-Germain | B61L 5/1881 340/815.45 |
| 2007/0040696 A1* | 2/2007 | Mubaslat | G01R 31/2635 340/657 |
| 2011/0006689 A1* | 1/2011 | Blanchard | H05B 33/0824 315/121 |
| 2013/0002141 A1* | 1/2013 | Lee | H05B 33/083 315/152 |
| 2017/0206819 A1* | 7/2017 | Pyo | G09G 3/006 |

FOREIGN PATENT DOCUMENTS

| | | |
|---|---|---|
| CN | 103857142 A | 6/2014 |
| CN | 103874287 A | 6/2014 |
| CN | 103076532 B | 12/2016 |
| WO | 2016044869 A1 | 3/2016 |

OTHER PUBLICATIONS

ISA Korean Intellectual Property Office, International Search Report and Written Opinion Issued in Application No. PCT/US2018/034748, dated Sep. 5, 2018, WIPO, 10 pages.

\* cited by examiner

*Primary Examiner* — Douglas W Owens
*Assistant Examiner* — Amy X Yang
(74) *Attorney, Agent, or Firm* — McCoy Russell LLP

(57) ABSTRACT

A system and method for operating a lighting array is disclosed. In one example, the system and method detect the presence or absence of short circuiting current flow through a light emitting device and provide an indication of the same. The system and method may also increase or decrease current flow through the lighting array to compensate for reduced lighting output or to reduce the possibility of lighting array degradation.

20 Claims, 9 Drawing Sheets

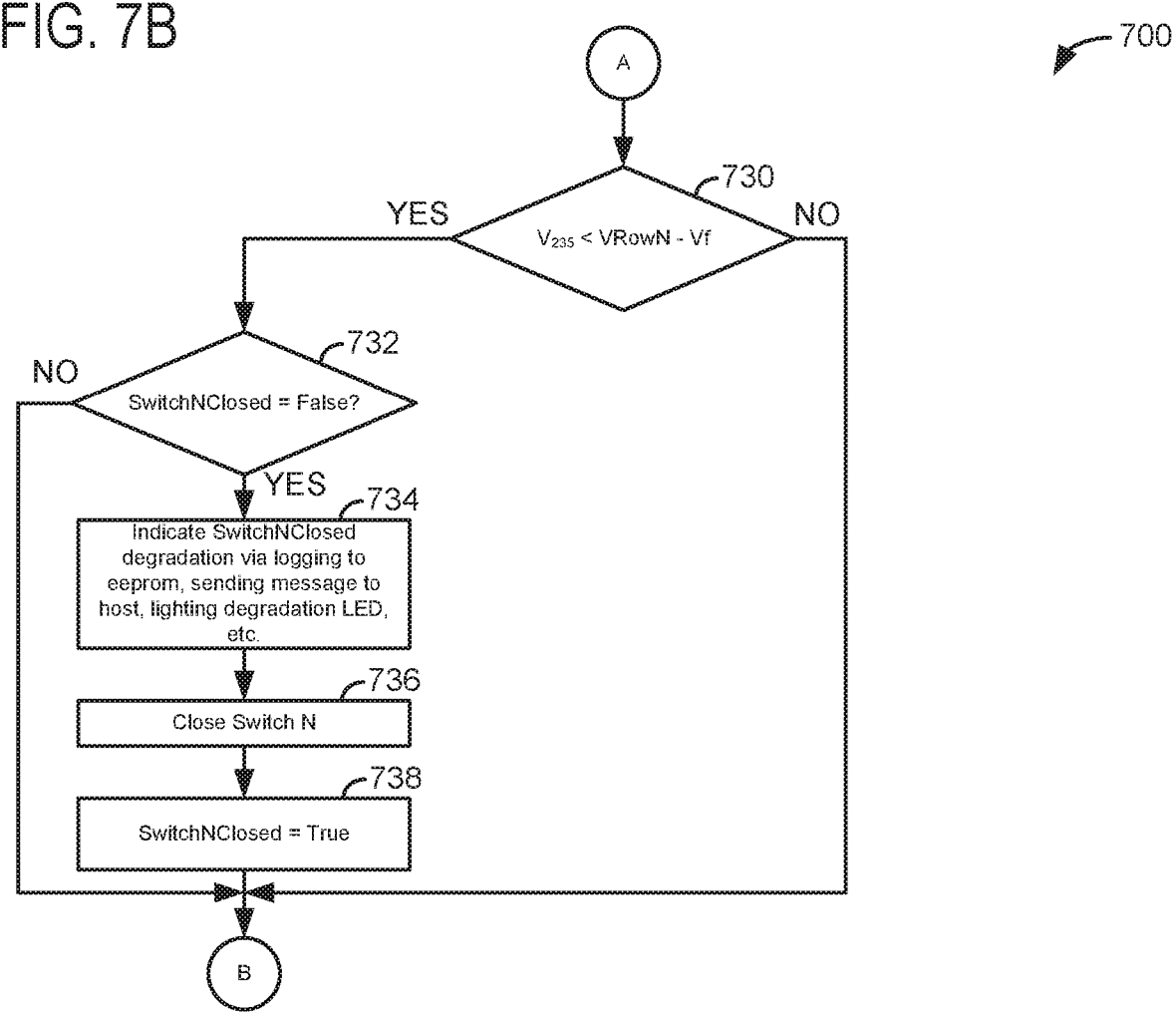

SYSTEM AND METHOD TO IDENTIFY SHORT CIRCUITING CURRENT AND OPEN CIRCUITS IN A SEMICONDUCTOR LIGHT MATRIX

BACKGROUND/SUMMARY

An array of solid-state lighting devices may be operated at various lighting intensity levels to cure photosensitive adhesives and media. The array may be configured in the form of an N×M matrix. The matrix allows current flow through the array to be controlled so that each solid-state lighting device included in the array may output light energy that is substantially the same as light energy emitted by other solid-state lighting devices included in the array. However, over time, short circuiting current may flow through one or more of the solid-state lighting devices included in the array. The short circuiting current may travel through a channel that may form in a solid-state lighting device adjacent to a P-N junction within the solid state lighting device. The short circuiting current may prevent one or more of the solid-state devices from lighting. Therefore, it would be desirable to provide a method and system for detecting the presence or absence of short circuiting current in a light emitting solid-state device.

The inventors herein have recognized the above-mentioned disadvantages and have developed a system for operating light emitting devices, comprising: an array of solid state lighting devices; a circuit controlling electric current flow through the array of solid state lighting devices; and a controller including executable instructions stored in non-transitory memory to provide an indication of a presence of short circuiting current in a solid state device included in the array of solid state lighting devices responsive to a voltage in the circuit controlling electric current flow through the array of solid state lighting devices.

By providing an indication of the presence of short circuiting current in a solid state lighting device of a lighting array, it may be possible to take mitigating actions to reduce the possibility of work piece degradation. Further, light intensity emitted from solid state lighting devices in the array that are not exhibiting short circuiting current may be increased so that lighting array power output may be maintained even in the presence of some short circuiting current. In some examples, individual rows of solid state devices where short circuiting current is present may be identified to reduce rework time of the lighting array. Additionally, in other examples, lighting array rows that exhibit open circuit conditions may be bypassed via switches so that the sub lighting array may continue to operate until other mitigating actions may be performed.

The present description may provide several advantages. In particular, the approach may improve lighting system light intensity control. Further, the approach may reduce the possibility of further degradation of solid state devices included in a solid-state lighting array. In addition, the approach may improve curing of work pieces when short circuiting current is present in one or more solid state lighting devices included in a lighting array.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 7A-7B shows a flowchart of a second method for controlling a lighting array.

DETAILED DESCRIPTION

Figure 1:
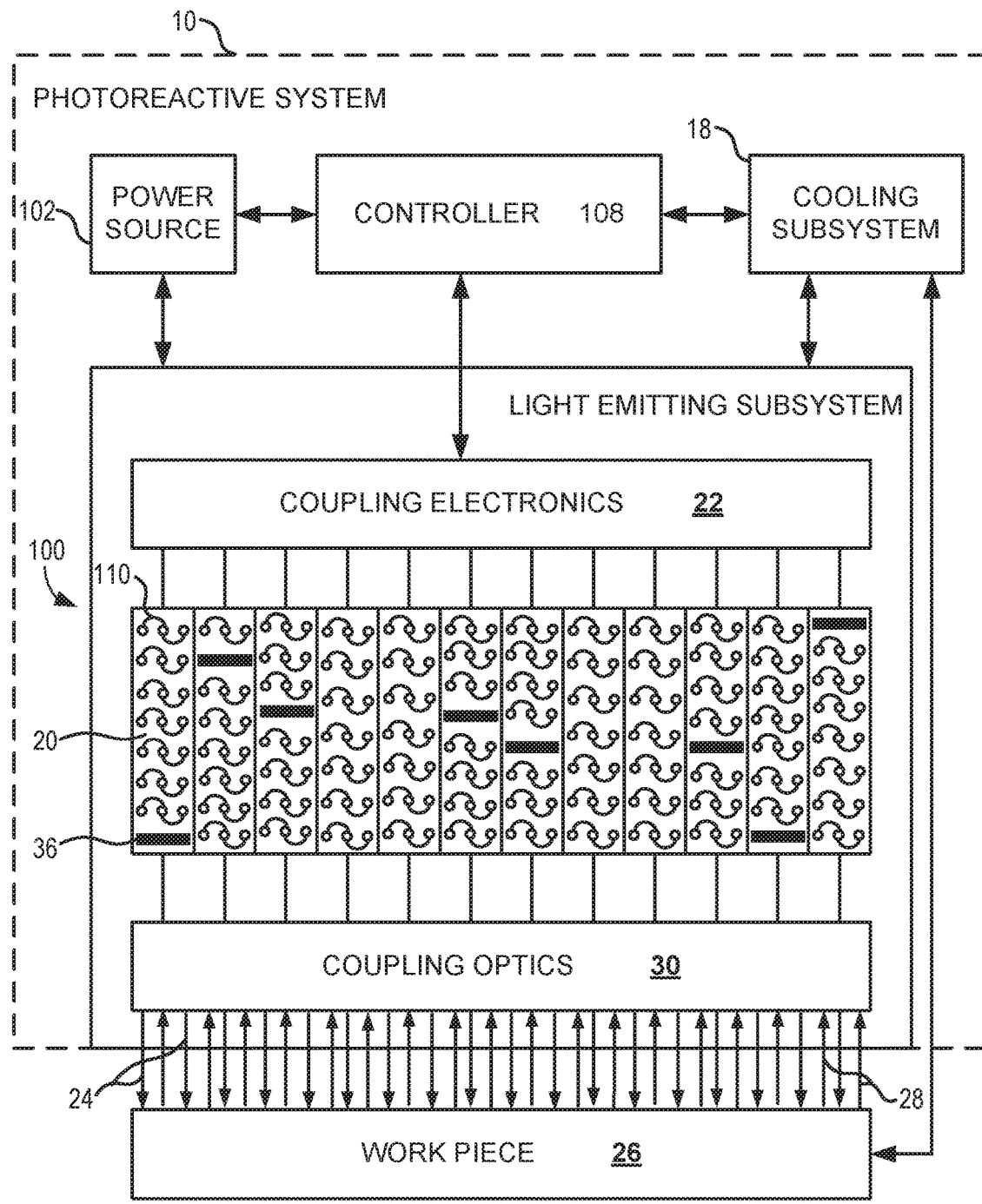
FIG. 1 shows a schematic depiction of a lighting system.

The present description is related to a lighting system with regulated current. FIG. 1 shows one example lighting system in which regulated current control is provided. The current controlled lighting system may be provided via the systems shown in FIGS. 2 and 3. However, alternative lighting systems that provide the described function or that operate similar to the systems shown are also included within the scope of the present description. The lighting systems may be operated according to the methods of FIGS. 4 and 7A-7B. The systems may operate as shown in the operating sequences illustrated in FIGS. 6 and 8. The systems may operate according to a lighting intensity level and system voltage relationship as shown in FIG. 5.

Referring now to FIG. 1, a block diagram of a photoreactive system 10 in accordance with the system and method described herein is shown. In this example, the photoreactive system 10 comprises a lighting subsystem 100, a controller 108, a power source 102 and a cooling subsystem 18.

The lighting subsystem 100 may comprise a plurality of light emitting devices 110. Light emitting devices 110 may be LED devices, for example. Selected of the plurality of light emitting devices 110 are implemented to provide radiant output 24. The radiant output 24 is directed to a work piece 26. Returned radiation 28 may be directed back to the lighting subsystem 100 from the work piece 26 (e.g., via reflection of the radiant output 24).

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis.

Each of the layers, materials or other structure may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor devices to the work piece 26, reflection at that interface may be reduced, eliminated, or minimized, so as to enhance the transmission of radiant output at that interface for ultimate delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the work piece 26.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component or subsystem 100, 102, 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the work piece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array (e.g., a first sub lighting array) may be controlled to emit light of a first intensity, wavelength, and the like, while those of a second array (e.g., a second sub lighting array) may be controlled to emit light of a second intensity, wavelength, and the like.

As a further example, under a first set of conditions (e.g. for a specific work piece, photoreaction, and/or set of operating conditions) controller 108 may operate photoreactive system 10 to implement a first control strategy, whereas under a second set of conditions (e.g. for a specific work piece, photoreaction, and/or set of operating conditions) controller 108 may operate photoreactive system 10 to implement a second control strategy. As described above, the first control strategy may include operating a first group (e.g., a first sub lighting array) of one or more individual semiconductor devices (e.g., LED devices) to emit light of a first intensity, wavelength, and the like, while the second control strategy may include operating a second group (e.g., a second sub lighting array) of one or more individual LED devices to emit light of a second intensity, wavelength, and the like. The first group of LED devices may be the same group of LED devices as the second group, and may span one or more arrays of LED devices, or may be a different group of LED devices from the second group, and the different group of LED devices may include a subset of one or more LED devices from the second group.

The cooling subsystem 18 is implemented to manage the thermal behavior of the lighting subsystem 100. For example, generally, the cooling subsystem 18 provides for cooling of such lighting subsystem 100 and, more specifically, the semiconductor devices 110. The cooling subsystem 18 may also be implemented to cool the work piece 26 and/or the space between the work piece 26 and the photoreactive system 10 (e.g., particularly, the lighting subsystem 100). For example, cooling subsystem 18 may be an air or other fluid (e.g., water) cooling system.

The photoreactive system 10 may be used for various applications. Examples include, without limitation, curing applications ranging from ink printing to the fabrication of DVDs and lithography. Generally, the applications in which the photoreactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may need to be delivered at or near the work piece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photoreactive system 10 may also have associated operating specifications. These specifications may include ranges (e.g., maximum and minimum) for operating temperatures and applied, electrical power, among other parameter specifications.

Accordingly, the photoreactive system 10 supports monitoring of the application's parameters. In addition, the photoreactive system 10 may provide for monitoring of semiconductor devices 110, including their respective characteristics and specifications. Moreover, the photoreactive system 10 may also provide for monitoring of selected other components of the photoreactive system 10, including their respective characteristics and specifications.

Providing such monitoring may enable verification of the system's proper operation so that operation of photoreactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (i.e., by controlling a component through control signals directed to the component, based on data respecting that components operation) or indirectly (i.e., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting subsystem 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the work piece 26 sufficient to properly complete the photoreaction(s) of the application.

In some applications, high radiant power may be delivered to the work piece 26. Accordingly, the lighting subsystem 100 may be implemented using an array of light emitting semiconductor devices 110. For example, the lighting subsystem 100 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. In one example, the array of light-emitting elements may be comprised of a Semiconductor Light Matrix™ (SLM) manufactured by Phoseon Technology, Inc. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

Furthermore, based on coupling electronics, selected of the semiconductor devices in the array 20 may be either/both multifunction devices and/or multimode devices, where (a) multifunction devices are capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices are capable of emission, detection and some other mode (e.g., off) and are switched among modes in accordance with the application parameters or other determinative factors.

Figure 2:
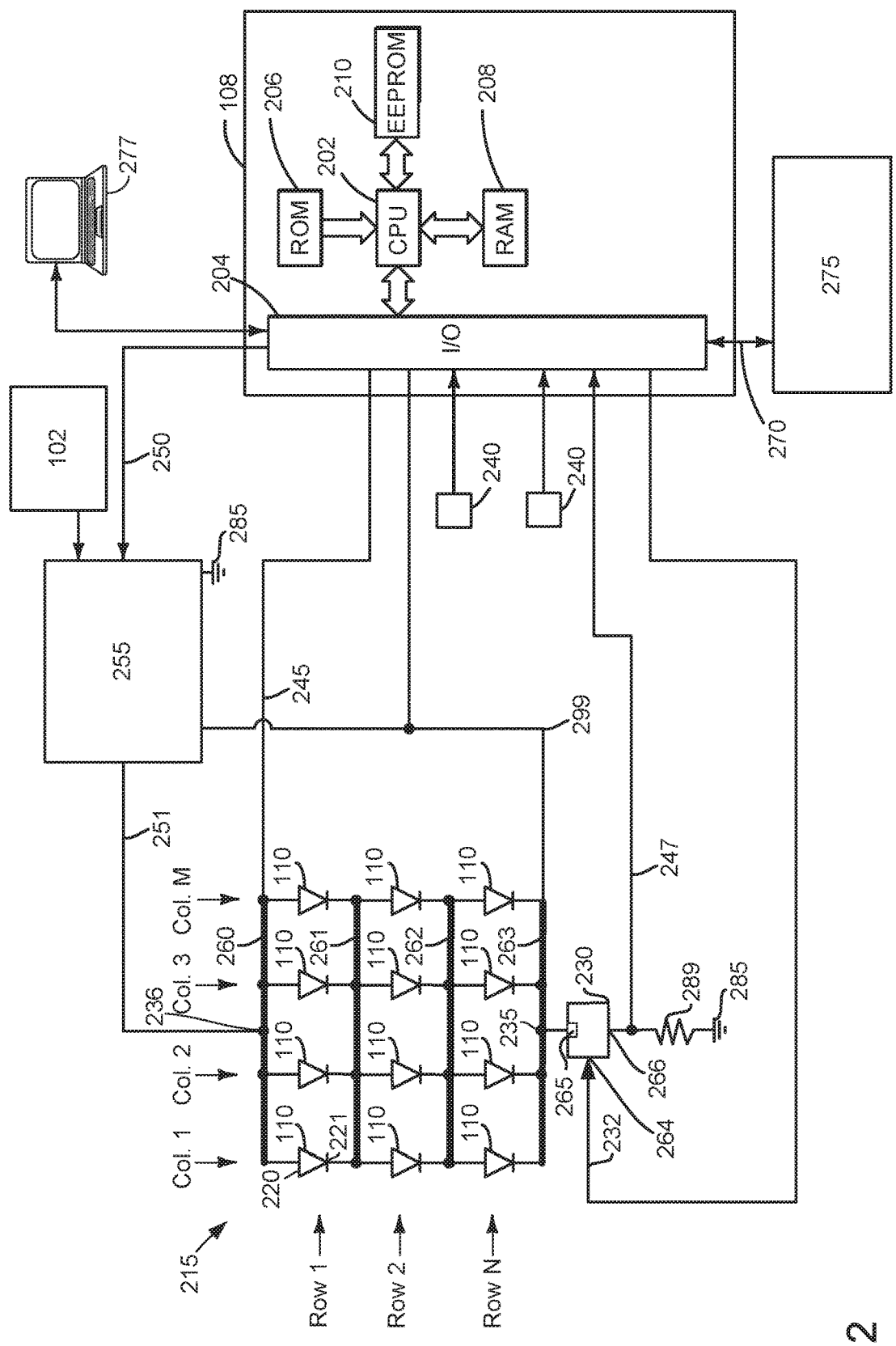
FIG. 2 shows a schematic of a first example lighting array control system.

Referring to FIG. 2, a schematic of a non-limiting first lighting system circuit that may supply varying amounts of current is shown. As previously discussed, photoreactive system 10 includes one or more light emitting devices 110. In this example, light emitting devices 110 are light emitting diodes (LEDs). Each LED 110 includes an anode 220 and a cathode 221, and LEDs 110 form sub lighting array 215. Lighting array 20 may include one or more sub lighting arrays 215. Driver 255 (e.g., a voltage regulator circuit) may output a positive voltage such that each of LEDs 110 are forward biased (e.g., higher positive voltage (+3V) applied to an anode of a LED and a lower voltage applied to cathode of the LED (ground)). Driver 255 is coupled to bus or conductor 260 at node 236, all of which are at a same voltage potential.

In this example, light emitting devices 110 are arranged in a 3×4 matrix forming sub lighting array 215. However, sub lighting array 215 may be comprised of any N×M arrangement of LEDs, where N is a variable that represents the total actual number of rows and M is a variable that represents the total actual number of columns. Each of the one or more sub lighting arrays 215 in lighting array 20 includes a variable resistor 230 and a fixed resistor 289, and each of the one or more sub lighting arrays 215 may be controlled via controller 108 and supplied electrical power as described herein.

Anodes of all LEDs in row 1 of sub lighting array 215 are electrically coupled together via bus or conductor 260, and driver circuitry 255 supplies DC power referenced to ground 285 to sub lighting array 215 via conductor 251 and bus or conductor 260. Cathodes of all LEDs in row 1 of sub lighting array 215 are electrically coupled together via bus or conductor 261, and anodes of all LEDs in row 2 of sub lighting array 215 are electrically coupled together via bus or conductor 261. Similarly, cathodes of all LEDs in row 2 of sub lighting array 215 are electrically coupled together via bus or conductor 262, and anodes of all LEDs in row 3 (labeled as row N in this example) of sub lighting array 215 are electrically coupled together via bus or conductor 262. Subsequent rows of sub lighting array 215 are electrically coupled together similar to the way LEDs 110 in row 2 are electrically coupled to LEDs 110 in rows 1 and 3. However, all cathodes of LEDs 110 in row N are electrically coupled together via bus or conductor 263 and bus or conductor 263 is electrically coupled to variable resistor 230 at node 235.

In one example, variable resistor 230 may be a variable resistor in the form of a field-effect transistor (FET). In other examples, variable resistor may take the form of other types of transistors (bipolar junction transistor (BJT), metal-oxide semiconductor field effect transistor (MOSFET), etc.). Variable resistor 230 may receive an intensity signal voltage from controller 108 via conductor 232 or a user input such as a potentiometer or other device (not shown). Alternatively, the variable resistor may simply be commanded to provide a low resistance to activate LEDs 110. By adjusting the resistance of variable resistor 230, an amount of current flowing through sub lighting array 215 may be adjusted. For example, an amount of current flowing through sub lighting array 215 may be decreased via increasing resistance of variable resistor 230. An amount of current flowing through sub lighting array 215 may be increased via decreasing resistance of variable resistor 230. In one example, a low voltage applied to gate 264 of variable resistor 230 via controller 108 provides a high resistance between input 265 (e.g., drain) and output 266 (e.g., source) of variable resistor 230. On the other hand, a higher voltage applied to gate 264 of variable resistor 230 via controller 108 provides a low resistance between input 265 and output 266 of variable resistor 230. Variable resistor 230 is electrically coupled to precision fixed resistor 289 such that electrical current that flows through variable resistor 230 also flows through fixed resistor 289. Fixed resistor 289 is also electrically coupled to ground potential 285. Current flow through sub lighting array 215 may be determined from a voltage that develops between fixed resistor 289 and variable resistor 230. Thus, fixed resistor 289 may be referred to as a current sensing resistor.

Controller 108 is shown in FIG. 2 as a conventional microcomputer including: central processing unit (CPU) 202, input/output ports 204, read-only memory (e.g., non-transitory memory) 206, random access memory 208, electrically erasable programmable read-only memory (EEPROM) 210, and a conventional data bus. The methods described herein may be stored as executable instructions in non-transitory memory 206. Further, controller status variables (e.g., bits, bytes, or words in memory, and which may be referred to as flags) that indicate status of photoreactive system 10, such as conditions of degradation, operating time, production volume, and prognostic indicators, may be stored in EEPROM. Controller 108 is shown receiving various signals from sensors within photoreactive system 10. Controller 108 may monitor a voltage applied to sub lighting array 215 at anodes of LEDs in row 1 via conductor 245 referenced to ground potential 285. Controller 108 may also monitor a voltage across fixed resistor 289 referenced to ground potential 285 via conductor 247 for determining current flow through sub lighting array 215. Controller 108 may also monitor resistance of a plurality of photo-resistive devices 240 to determine light intensity near the work piece 26 and provide closed-loop light intensity control of photoreactive system 10. For example, controller 108 may adjust resistance of variable resistor 230 based on electrical current flow through fixed resistor and light intensity as measured via photo-resistive devices 240. Further, controller 108 may activate and/or deactivate driver 255 to adjust voltage applied to sub lighting array 215. Controller 108 may also provide operational data including but not limited to diagnostic data, production data, and prognostic data to an external or remote host computer 275 via local area network 270 or internet connection. Further, controller 108 may provide and receive input from human/machine interface 277.

During normal operating conditions, photoreactive system 10 may operate as described herein. Controller 108 may activate driver 255 and power supply 102 when prompted via human or host computer input. A voltage is output via driver 255 to sub lighting array 215 via conductor 251. Driver 255 adjusts its output voltage in response to voltage feedback received via conductor 299, which senses voltage between variable resistor 230 and sub lighting array 215. Current flow through sub lighting array 215 is adjusted via adjusting resistance of variable resistor 230. Current flow through sub lighting array 215 may be adjusted in response to a desired lighting intensity level. In one example, a table or function that holds empirically determined sub lighting array current values is indexed or referenced via a desired lighting intensity level. The table or function outputs a desired electric current flow through the sub lighting array 215 so that the desired lighting intensity may be provided via the sub lighting array 215. The desired electric current flow rate may be adjusted via controller 108 responsive to a voltage measured between variable resistor 230 and fixed resistor 289. In this way, electric current flow through sub lighting array 215 may be feedback controlled while the voltage between variable resistor 230 and the anodes of LEDs in the Nth row is closed loop controlled. Controller 108 adjusts a voltage applied to variable resistor 230 (e.g., a gate of a FET) to control current flow through sub lighting array 215 and variable resistor 230. The desired lighting intensity level may be requested via a human or via a predetermined lighting intensity schedule that may be based on work piece 26 and process requirements.

A voltage drop occurs across each row of sub lighting array 215 when a voltage is applied to sub lighting array 215 and current is flowing through sub lighting array 215. In addition, a substantially same (e.g., a difference of less than five percent) voltage drop occurs across each row of sub lighting array 215 so that each row may output equivalent lighting power as each of the other rows in sub lighting array 215 outputs. Further, electric current flow through each of the rows is equal. Such operation is enabled via coupling cathodes of one row to anodes of another row as previously described.

In other examples, driver 255 may output a fixed constant voltage and current flow through the sub lighting array 215 may be controlled via adjusting resistance of variable resistor 230.

Over time it may be possible for LEDs 110 to degrade. For example, if a LED of a row degrades and enters an open circuit mode (e.g., less than a threshold amount of current may flow through the LED), electric current may continue to flow through other LEDs in the same row. This allows sub lighting array 215 to continue to provide light even if a LED enters open circuit mode. However, during some conditions, it may be possible for an electrical current path to develop in a LED, which may be referred to as a short circuiting current path, when a forward voltage is applied to the LED.

The short circuiting current path may form in parallel with the LED's P-N junction (e.g., a short circuiting current path). The electric short circuiting current path in the LED may exhibit low resistance such that electric current flows through the LED before the diode's forward voltage is reached. The electric short circuiting current flow through the lower resistance path in the LED may increase a temperature of the LED, and increasing temperature of the LED may further reduce resistance in the electric short circuiting current path. Eventually, a substantially portion of current flowing through the row of the sub lighting array 215 that holds the LED with the short circuiting current path flows through the LED with the short circuiting current path. Consequently, a forward voltage of the LEDs in the row of the sub lighting array 215 that holds the LED with the short circuiting current path is not reached and the entire row of LEDs may not illuminate. As a result, working piece 26 may not be exposed to a desired amount of light energy. Accordingly, it may be desirable to detect LED short circuiting current that is present and provide compensation and/or an indication of LED degradation.

Short circuiting current paths through one or more LEDs may be identified as a change in voltage output from driver 255 and a change in voltage applied to anodes of LEDs in the first row of the sub lighting array 215 for systems that maintain a constant voltage between variable resistor 230 and cathodes of LEDs in the Nth row of the sub lighting array 215. The voltage output from driver 255 may be reduced in response to a reduced resistance of one or more rows in sub lighting array 215. In particular, output voltage of driver 255 may be reduced to maintain a constant voltage between variable resistor 230 and cathodes of the Nth LED row while a desired current flow is maintained through sub lighting array 215 in response to reduced resistance of sub lighting array 215 that may result from a short circuiting current path. Because resistance of sub light array 215 may be reduced when a short circuiting current path is present in a LED of sub light array 215, voltage output of driver 255 has to be reduced to maintain a constant voltage between variable resistor 230 and cathodes of LEDs in the Nth row of the sub lighting array 215 while a desired current flow (e.g., a current flow for a desired lighting intensity level) through the sub lighting array 215 is maintained.

For a system where driver 255 outputs a constant voltage and current flow is adjusted via adjusting resistance of variable resistor 230, short circuiting current may be identified by a voltage change observed between variable resistor 230 and cathodes of LEDs in the Nth row or last row of sub lighting array 215. In particular, if short circuiting current develops through a LED in sub lighting array 215, resistance of sub lighting array 215 decreases causing controller 108 to increases resistance of variable resistor 230 to maintain a desired current flow through sub lighting array 215. The increase in resistance of variable resistor 230 and the decrease in resistance of sub lighting array 215 increases voltage between variable resistor 230 and cathodes of LEDs in the Nth row of the sub lighting array since current flow through the sub lighting array 215 is maintained at a desired level via increasing resistance of variable resistor 230.

Figure 3:
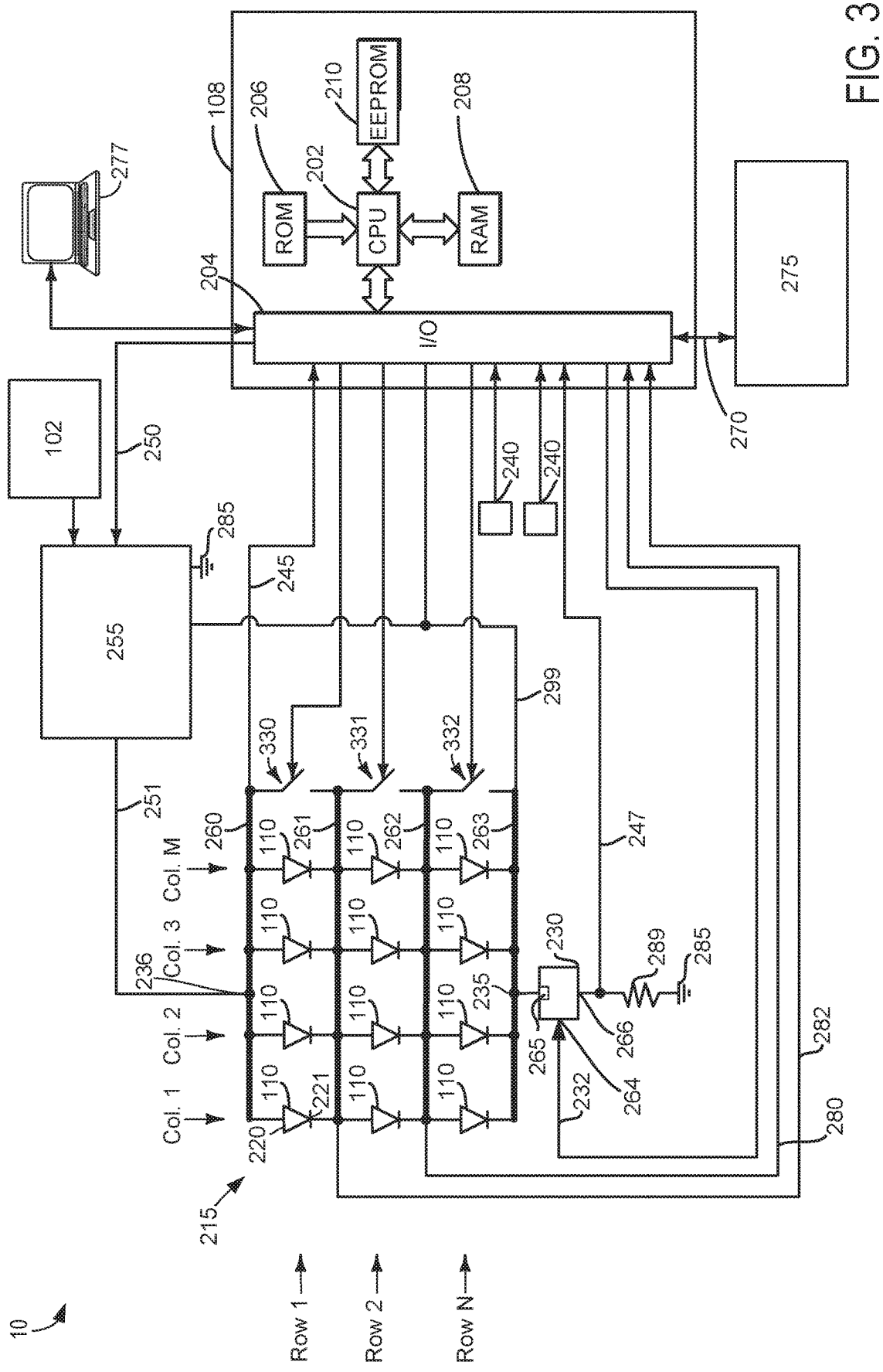
FIG. 3 shows a schematic of a second example lighting array control system.

Referring now to FIG. 3, a schematic of a second non-limiting example lighting array control system circuit is shown. The sub lighting array control system of FIG. 3 includes all the components as the lighting control system of FIG. 2. In addition, the components and controller of the sub lighting array control system of FIG. 3 operate as discussed in the description of FIG. 3 unless otherwise indicated. Therefore, for the sake of brevity, only new components and features of the system of FIG. 3 are described.

In this example, voltage for each row may be measured via controller 108. In particular, controller 108 may sample voltages at each row 1-N via conductors 245, 280, 282, and 299. Of course, if sub lighting array 215 includes additional rows, additional conductors may be provided to allow controller 108 access to voltages of each row of sub lighting array 215.

Additionally, photoreactive system 10 also includes switches (e.g., 330-332) for bypassing each of the N rows of sub lighting array 215. A switch is provided for each row of sub lighting array 215, and N switches may be provided for N rows in sub lighting array 215. For example, switch number one (330) is provided to bypass row 1 and switch number two (331) is provided to bypass row 2. The switches may be solid state switches (e.g., transistors) or switches that include metallic contacts. Each of the switches may be individually opened and closed via controller 108. In one example, as discussed with regard to FIG. 7, a switch associated with a row of sub lighting array 215 may be closed when a voltage of a row is less than a voltage of an immediately previous row minus an expected voltage drop of the row (e.g., an increase in voltage between anodes and cathodes of LEDs in a row). A voltage of a row that is less than voltage of an immediately previous row minus an expected voltage drop may be indicative of an open circuit for the row. For example, a voltage at cathodes of LEDs in row number two of a sub lighting array is less than a voltage at cathodes of LEDs in row number one of the sub lighting array minus a predetermined forward voltage, it may be determined that there is an open circuit condition present for row number two LEDs. However, if the voltage at cathodes of LEDs in row number two of the sub lighting array is not less than the voltage at cathodes of LEDs in row number one of the sub lighting array minus the predetermined forward voltage, it may be determined that there is not an open circuit condition present for row number two LEDs. Each of the switches associated with the rows of sub lighting array 215 may be held open until an open circuit condition of a row is detected via a voltage of a row being less than a voltage of an immediately previous row minus a threshold voltage. If a voltage of a row is less than a voltage of an immediately previous row minus a threshold voltage, the switch associated with the row may be closed so that voltage may be applied to subsequent rows in the sub lighting array 215. By closing the switch, it may be possible to provide more consistent lighting to work piece 26 since a substantial portion of LEDs in the sub lighting array 215 may remain active even in the presence of an open circuit in a row of the sub lighting array 215. Closing a switch of one row transfers voltage and current from a row immediately before the row having the open circuit condition to a row immediately after the row having the closed switch.

The systems of FIGS. 1-3 provide for a system for operating light emitting devices, comprising: an array of solid state lighting devices; a circuit controlling electric current flow through the array of solid state lighting devices; and a controller including executable instructions stored in non-transitory memory to provide an indication of a presence of short circuiting current in a solid state device included in the array of solid state lighting devices responsive to a voltage in the circuit controlling electric current flow through the array of solid state lighting devices. The system includes where the indication is in the form of writing a variable to EEPROM memory. The system includes where the voltage is a voltage applied to a first row of solid state lighting devices in the array of solid state lighting devices. The system includes where the voltage is a voltage applied to a variable resistor in the circuit controlling electric current flow through the array of solid state lighting devices.

In some examples, the system further comprises a driver (e.g., a voltage regulator) that supplies a voltage to the array of solid state lighting devices. The system includes where the voltage is responsive to a voltage applied to a variable resistor. The system further comprising additional instructions to increase current flow through the array of solid state lighting devices in response to the voltage in the circuit controlling electric current flow through the array of solid state lighting devices. The system includes where the circuit controlling electric current flow through the array of solid state lighting devices includes a driver, the array of solid state lighting devices, a variable resistor, and a fixed resistor.

The systems of FIGS. 1-3 also provides for a system for operating light emitting devices, comprising: an array of solid state lighting devices including N rows of solid state lighting devices and M columns of solid state lighting devices; N switches for selectively bypassing N rows in the array of solid state lighting devices; a circuit controlling electric current flow through the array of solid state lighting devices; and a controller including executable instructions stored in non-transitory memory to provide close one of the N switches and provide an indication of a presence of an open circuit in a row in the array of solid state lighting devices responsive to a voltage in the circuit controlling electric current flow through the array of solid state lighting devices. The system further comprises N conductors for sensing voltage at each of the N rows of solid state lighting devices.

Figure 4:
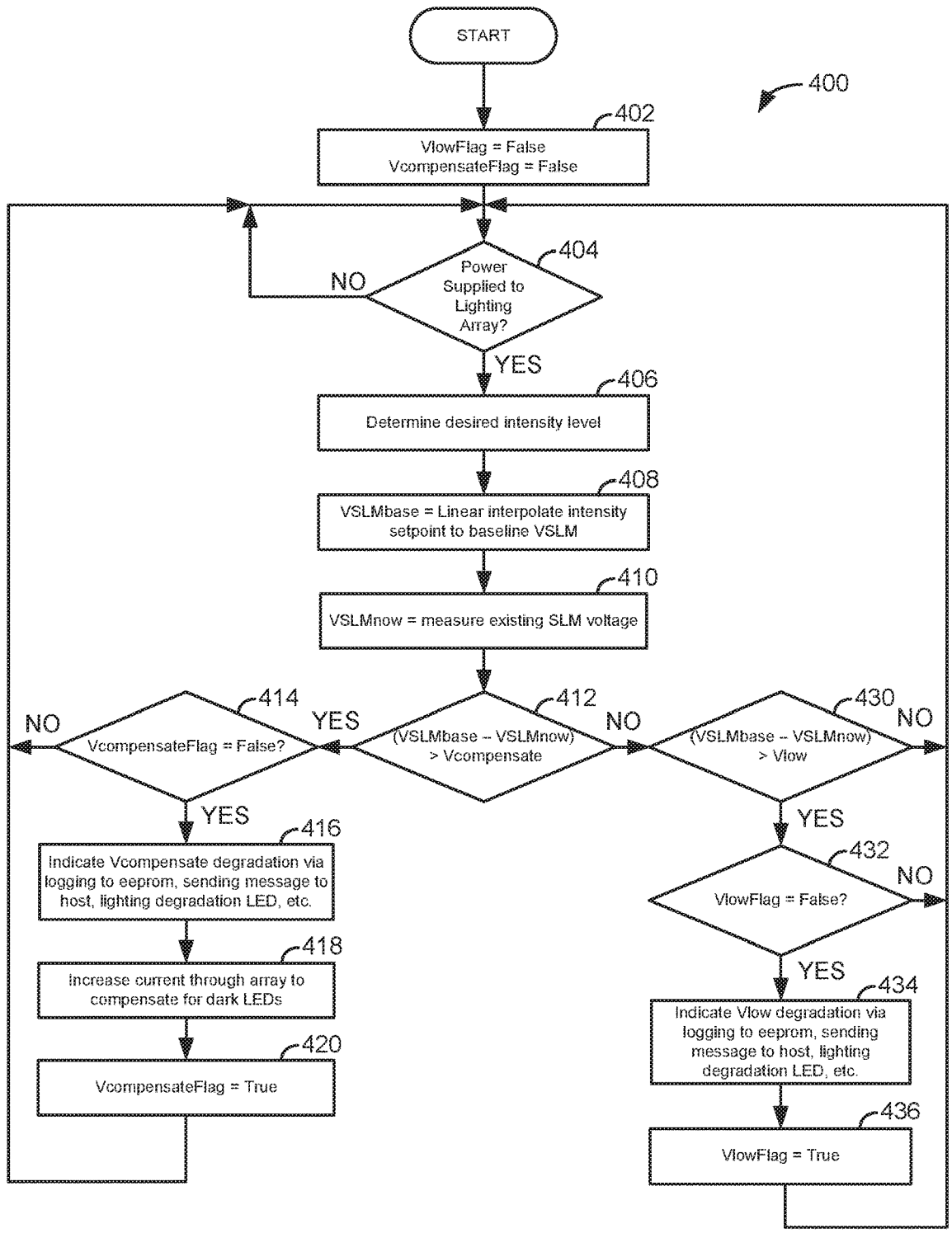
FIG. 4 shows flowchart of a first method for controlling a lighting array.
Figure 5:
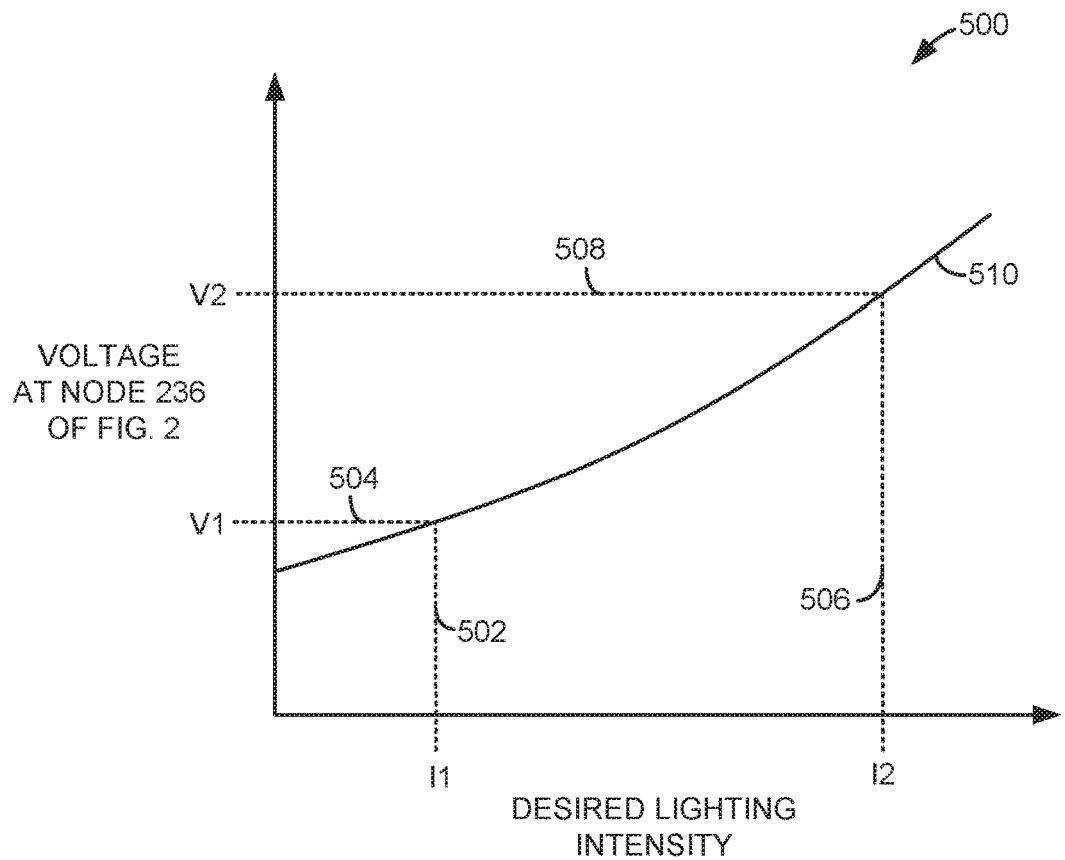
FIG. 5 is a plot that illustrates a relationship between desired lighting intensity and voltage.

Referring now to FIG. 4, a method for detecting current flow through in a LED when a voltage is applied to the LED and current flows through the LED without the LED's forward voltage being exceeded is shown. The current may be referred to as a short circuiting current. The method of FIG. 4 may be stored as executable instructions in non-transitory memory in systems such as shown in FIGS. 1-3. The method of FIG. 4 may be incorporated into and may cooperate with the systems of FIGS. 1-3. Further, at least portions of the method of FIG. 4 may be incorporated as executable instructions stored in non-transitory memory while other portions of the method may be performed via a controller transforming operating states of devices and actuators in the physical world.

At 402, method 400 adjusts values of two variables stored in controller RAM to false. The first variable VlowFlag represents a state of whether or not a first level of short circuiting current through a LED is detected. The short circuiting current may be detected when the LEDs in the sub lighting array are forward biased. The first level of short circuiting current may be a level that reduces LED lighting intensity by a first threshold amount (e.g., ten percent when a predetermined amount of current flows through the sub lighting array). Initially the variable VlowFlag is adjusted to a value of false to indicate the absence of short circuiting current greater than the first level.

The second variable VcompensateFlag represents a state of whether or not a second level of short circuiting current through a LED is detected. The second level of short circuiting current may be a level that reduces LED lighting intensity by a second threshold amount (e.g., thirty percent when a predetermined amount of current flows through the sub lighting array). Initially the variable VcompensateFlag is adjusted to a value of false to indicate the absence of short circuiting current greater than the second level. The state of variable VcompensateFlag also provides an indication that current flow through the sub lighting array may be increased to compensate for a row of LEDs that may not illuminate. Method 400 proceeds to 404.

At 404, method 400 judges if electric power is supplied to one or more sub lighting arrays 215. Method 400 may judge that electric power is supplied to one or more sub lighting arrays 215 when driver 255 and power supply 102 are activated. In still other examples, method 400 may judge that electric power is supplied to one or more sub lighting arrays 215 based on whether or not a predetermined voltage is applied to a first row of LEDs in one or more sub lighting arrays 215. Driver 255 adjusts a voltage applied to node 236 of FIG. 2 in response to a voltage measured at node 235 of FIG. 2. For example, if it is desired to have 3 volts at node 235, driver 255 increases or decreases voltage applied to node 236 to achieve 3 volts at node 235. The desired voltage at node 235 may be based on the actual total number of rows in the sub lighting array. Alternatively, driver 255 may output a predetermined constant voltage. If method 400 judges that electric power is supplied to one or more sub lighting arrays, the answer is yes and method 400 proceeds to 406. Otherwise, the answer is no and method 400 returns to 404.

At 406, method 400 determines a desired light intensity level for one or more sub lighting arrays 215. In one example, method 400 may retrieve a desired light intensity level from a table or function stored in controller memory. The table or function may be indexed via work piece information or process information. Alternatively, method 400 may retrieve a desired intensity level from a human/machine interface.

Method 400 also adjusts current flow through the variable resistor to provide the desired light intensity level. In one example, method 400 interpolates between values of a table or function to determine how to adjust the variable resistor 230. Values in the table correspond to a voltage that when applied to a gate of a FET provides a predetermined resistance via the FET, and values in the table or function may be determined based on known resistances and voltages. For example, because voltage at node 235 is adjusted to a known constant value, current flow through variable resistor 230 and sub lighting array 215 may be readily determined via dividing the voltage at node 235 by the combined resistance of variable resistor 230 and fixed resistor 289. Thus, the resistance of variable resistor 230 stored in the table or function may be adjusted to a value that provides a desired current flow, which provides a desired light intensity, via the following equation:

$$R_{var} = \frac{V_{n235}}{I_{des}} - R_{fix}$$

where $R_{var}$ is the desired resistance of the variable resistor, $V_{n235}$ is the voltage at node 235 of FIG. 2, $I_{des}$ is the desired current that provides the desired lighting intensity level, and $R_{fix}$ is the resistance of fixed resister 289. The $I_{des}$ value that provides the desired lighting intensity level may be empirically determined and stored to a table or function in controller memory that is referenced or indexed by the desired lighting intensity level. However, if output of driver 255 is adjusted to apply a fixed voltage to node 236 of FIG. 2, then resistance of variable resistor 230 may be adjusted via the following equation:

$$R_{var} = \frac{V_{n236}}{I_{des}} - R_{fix} - R_{array}$$

where $R_{var}$ is the desired resistance of the variable resistor, $V_{n236}$ is the voltage at node 236 of FIG. 2, $I_{des}$ is the desired current that provides the desired lighting intensity level, and $R_{fix}$ is the resistance of fixed resister 289, and $R_{array}$ is the resistance of sub lighting array 215. Once the desired resistance is known, a function or table that outputs a voltage to apply to the variable resistor (e.g., to a gate of the FET) may be indexed or referenced by the desired resistance value. The voltage is then applied to the variable resistor to provide the desired current flow through the sub lighting array 215 and the desired lighting intensity. Method 400 proceeds to 408.

At 408, method 400 linearly interpolates a baseline voltage at a location along the conductive path between node 236 and fixed resistor 289. In one example where voltage at node 235 is controlled to a constant value via adjusting output voltage of driver 255, a voltage at node 236 is determined from a table or function as shown in FIG. 5 that holds empirically determined voltage values based on the desired intensity level. If the present desired lighting intensity level does not have a corresponding voltage value in the table or function, the voltage value at node 236 is determined via linearly interpolating between known voltages in the table or function. In other examples, such as where voltage at node 236 is controlled to a constant value, output of the table or function may correspond to another location along the conductive path between node 236 and fixed resistor 289. For example, output of the table or function may be a voltage at node 235 when voltage at node 236 is controlled to a constant value. The value output from the table may be referenced as VSLMbase. Method 400 proceeds to 410.

At 410, method 400 measures voltage at a location along the conductive path between node 236 and fixed resistor 289. In one example, where driver voltage is adjusted to provide a constant voltage at node 235, controller 108 measures a voltage at node 236. In another example, where driver outputs a constant voltage to node 236, controller 108 measures a voltage at node 235. In other examples, controller 108 may measure voltages at other locations along the conductive path between node 236 and fixed resistor 289. The measured voltage may be stored as variable VSLMnow. Method 400 proceeds to 412.

At 412, method 400 judges if the baseline voltage VSLMbase determined at 408 minus the measured voltage determined at 410 is greater than a predetermined voltage Vcompensate. The predetermined voltage Vcompensate may be a voltage that represents a voltage drop at the location along the conductive path between node 236 and fixed resister 289 that is indicative of a larger short circuiting current in a LED in the sub lighting array 215. In the example, where output of driver 255 is adjusted to provide a constant voltage at node 235 even in the presence of short circuiting current in a LED, the location where the voltage may drop due to a short circuit current in a LED is node 236. In the example, where output of driver 255 is a constant voltage and the location where the voltage drop due to a short circuit current in a LED may be at node 235. If method 400 judges that the baseline voltage determined at 408 minus the measured voltage determined at 410 is greater than a predetermined voltage Vcompensate, the answer is yes and method 400 proceed to 414. Otherwise, the answer is no and method 400 proceeds to 430.

At 430, method 400 judges if the baseline voltage VSLMbase determined at 408 minus the measured voltage determined at 410 is greater than a predetermined voltage Vlow. The predetermined voltage Vlow may be a voltage that represents a voltage drop at the location along the conductive path between node 236 and fixed resister 289 that is indicative of a smaller short circuiting current in a LED in the sub lighting array 215. In the example, where output of driver 255 is adjusted to provide a constant voltage at node 235 even in the presence of short circuiting current in a LED, the location where the voltage may drop due to a short circuit current in a LED is node 236. In the example, where output of driver 255 is a constant voltage and the location where the voltage drop due to a short circuit current in a LED may be at node 235. If method 400 judges that the baseline voltage determined at 408 minus the measured voltage determined at 410 is greater than a predetermined voltage Vlow, the answer is yes and method 400 proceed to 432. Otherwise, the answer is no and method 400 returns to 404.

At 432, method 400 judges if the variable VlowFlag is false. If so, the answer is yes and method 400 proceeds to 434. Otherwise, the answer is no and method 400 returns to 404.

At 434, method 400 indicates a lower level of LED and sub lighting array degradation. In one example, method 400 writes a value (e.g., 1) to a location in EEPROM to indicate the lower level of LED or sub lighting array degradation. Alternatively, or in addition, method 400 may send a variable to a host computer via a LAN, internet, or other medium to indicate the lower level of LED or sub lighting array degradation. Additionally, method 400 may provide an indication of degradation via illuminating a LED or modifying a value presented on a human/machine interface. Method 400 proceeds to 436.

At 436, method 400 adjusts the value of VlowFlag to true. Method 400 then returns to 404.

At 414, method 400 judges if the variable VcompensateFlag is false. If so, the answer is yes and method 400 proceeds to 416. Otherwise, the answer is no and method 400 returns to 404.

At 416, method 400 indicates a higher level of LED and sub lighting array degradation. In one example, method 400 writes a value (e.g., 2) to a location in EEPROM to indicate the higher level of LED or sub lighting array degradation. Alternatively, or in addition, method 400 may send a variable to a host computer via a LAN, internet, or other medium to indicate the higher level of LED or sub lighting array degradation. Additionally, method 400 may provide an indication of degradation via illuminating a LED or modifying a value presented on a human/machine interface. Method 400 then proceeds to 418.

At 418, method 400 increases current supplied to LEDs in sub lighting array 215 to increase light intensity of working LEDs to compensate for LEDs that are not illuminated due to short circuiting current flowing through one or more LEDs. In one example, the current is increased a predetermined amount. By increasing the current, a substantially equivalent amount of light energy may be provided to the work piece after short circuiting current is determined as before the short circuiting current occurred. In alternative examples, method 400 may cease current flow to sub lighting array 215 after a present lighting cycle is completed (e.g. a period of time to cure a work piece). By ceasing current flow to sub lighting array 215, production and workflow may be ceased to permit further diagnosis of the sub lighting array. Method 400 proceeds to 420.

At 420, method 400 adjusts the value of VcompensateFlag to true. Method 400 then returns to 404.

Thus, method 400 may determine short circuiting current flow through a LED via a measured voltage of a lighting array control circuit. Method 400 may also adjust current supplied to the sub lighting array circuit to compensate for LEDs that may not illuminate. In these ways, method 400 may control operation of a lighting array and provide users and operators of the sub lighting array multiple levels of indicating lighting array degradation.

Referring now to FIG. 5, an example plot of a function illustrating a relationship between desired lighting intensities provided by the sub lighting array 215 and voltage values at a location along a conducting path between node 236 of FIG. 2 and fixed resistor 289 is shown. For example, the voltage may be at node 235. The horizontal axis represents desired lighting intensity provided by sub lighting array 215. The vertical axis represents voltage at the location along a conducting path between node 236 of FIG. 2 and fixed resistor 289 corresponding to the desired lighting intensity levels.

The plot includes a first desired lighting intensity I1 and a second desired lighting intensity I2. The baseline voltage corresponding to desired lighting intensity I1 may be determined via referencing function 500 via desired lighting intensity I1 and extracting the value V1. The value V1 may be determined via following line 502 to where it intersects with curve 510 and then following horizontal line to V1. Similarly, a second baseline voltage corresponding to desired lighting intensity I2 may be determined via referencing function 500 via desired lighting intensity I2 and extracting the value V2. The value V2 may be determined via following line 506 to where it intersects with curve 510 and then following horizontal line to V2.

Figure 6:
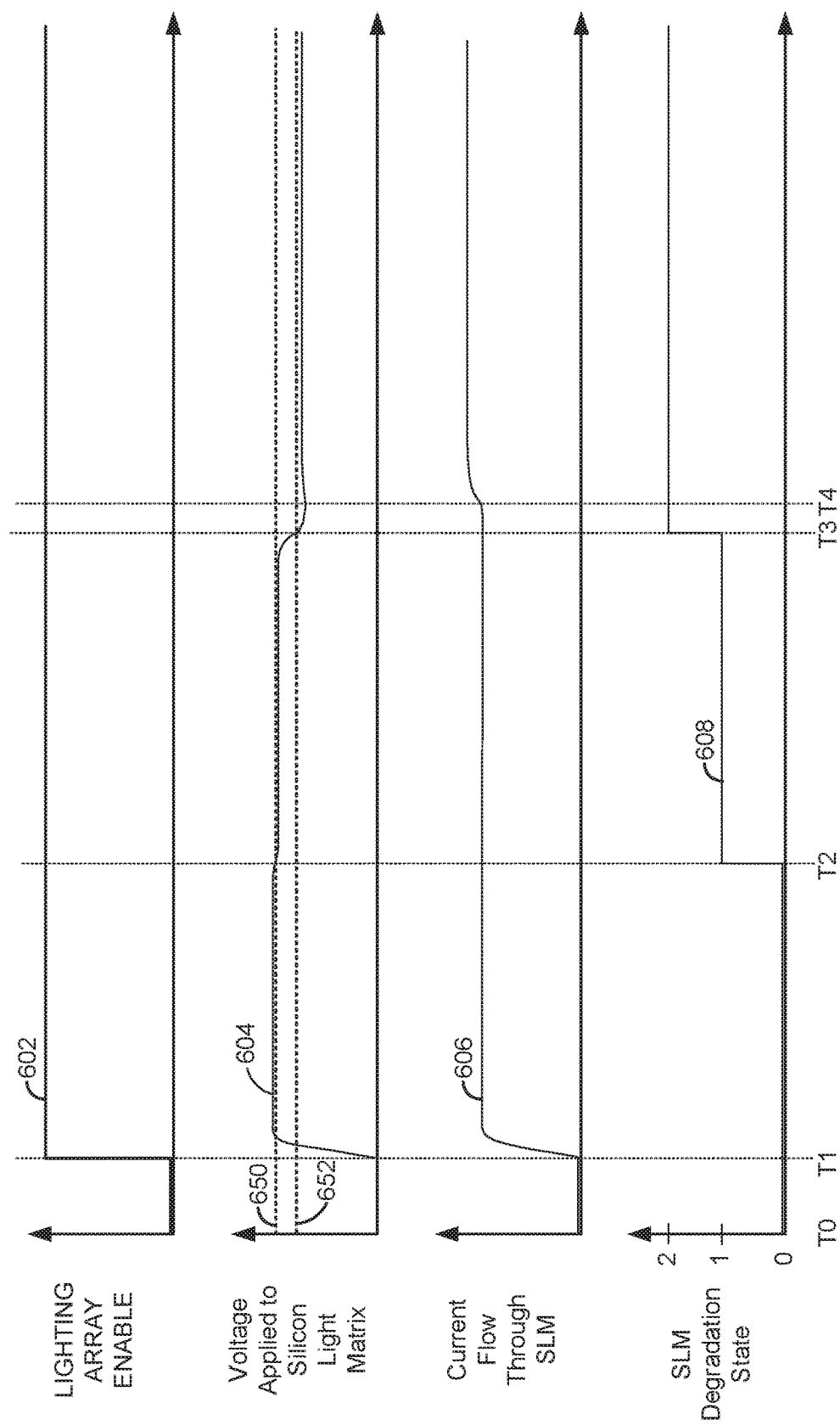
FIG. 6 shows an example lighting array operating sequence according to the method of FIG. 4.

Referring now to FIG. 6, example prophetic lighting array operating sequence is shown. FIG. 6 shows four plots that are time aligned and that occur at a same time. Vertical markers at times T0-T4 represent times of interest. The sequence of FIG. 6 may be provided by the method of FIG. 4 and the system shown in FIGS. 1 and 2.

The first plot from the top of FIG. 6 is a plot of a lighting array enable or activation request versus time. The sub lighting array activation request may be provided by a host computer or human. The vertical axis represents a voltage level of the sub lighting array enable signal and the voltage level increases from the horizontal axis. The sub lighting array is requested to be enabled and activated when trace 602 is at a higher level. The sub lighting array is requested off and deactivated when the trace 602 is at a lower level. The horizontal axis represents time and time increases from the left side of the figure to the right side of the figure.

The second plot from the top of FIG. 6 is a plot of a voltage applied to a sub lighting array 215. The voltage is applied at node 236 of FIG. 2. The vertical axis represents voltage applied to sub lighting array 215 and the voltage increases from the horizontal axis in the direction of the vertical axis arrow. The horizontal axis represents time and time increases from the left side of the figure to the right side of the figure. The horizontal line 650 represents a threshold voltage below which VSLMbase-VSLMnow is >Vlow. The horizontal line 652 represents a threshold voltage below which VSLMbase-VSLMnow is >Vcompensate. Trace 604 represents voltage applied to the sub lighting array.

The third plot from the top of FIG. 6 is a plot of current flow through sub lighting array 215. The vertical axis represents current flow through sub lighting array 215 and current flow through the sub lighting array 215 increases in the direction of the vertical axis arrow. The horizontal axis represents time and time increases from the left side of the figure to the right side of the figure. Trace 606 represents current flow through the sub lighting array.

The fourth plot from the top of FIG. 6 is a plot of sub lighting array degradation state versus time. The vertical axis represents sub lighting array or SLM degradation state and the three degradation states are indicated by values 0-2 located alongside the vertical axis. Degradation state 0 indicates no degradation. Degradation state 1 indicates that VSLMbase-VSLMnow is >Vlow and a smaller amount of short circuiting current is present in one or more LEDs. Degradation state 2 indicates that VSLMbase-VSLMnow is >Vcompensate and a larger amount of short circuiting current is present in one or more LEDs. The horizontal axis represents time and time increases from the left side of the figure to the right side of the figure. Trace 608 represents sub lighting array state.

At time T0, the sub lighting array 215 is off as indicated by the sub lighting array enable trace 602 not being asserted or not being at a higher level. Voltage applied to the sub lighting array 215 is zero and current flow through the sub lighting array 215 is also zero. Sub lighting array degradation is not indicated.

At time T1, the sub lighting array 215 is commanded on as indicated by the sub lighting array enable trace 602 being asserted and at a higher level. The voltage applied to sub lighting array 215 begins to increase as does current flow through sub lighting array 215 in response to the sub lighting array enable being asserted. Sub lighting array degradation is not indicated.

At time T2, the voltage applied to sub lighting array 215 declines to a level below level 650, which causes sub lighting array degradation state to change from a level of zero to a level of one. Accordingly, a first level indication of sub lighting array degradation may be provided to lighting supervisory systems and humans. In this example, the voltage drop at time T2 is caused by driver 255 of FIG. 2 being reduced to maintain a constant voltage at node 235 of FIG. 2 in the presence of short circuiting current beginning to flow in a LED in the sub lighting array, which reduces a voltage drop across the LED. Current flow through the sub lighting array 215 is maintained constant by adjusting resistance of variable resistor 230 shown in FIG. 2.

Between time T2 and time T3, the sub lighting array 215 remains enabled and the first level of sub lighting array degradation is indicated. The voltage applied to sub lighting array 215 remains below level 650 and above level 652. Current flow through sub lighting array 215 remains constant.

At time T3, the voltage applied to sub lighting array 215 is reduced to less than level 652, which causes a second level of sub lighting array degradation to be indicated. The current flow through sub lighting array 215 at time T3 remains constant. Shortly thereafter at time T4, current flow through sub lighting array 215 is increased in response to the second level of degradation. The current flow through sub lighting array 215 is increased by reducing resistance of the variable resistor 230 shown in FIG. 2.

In this way, method 400 and the systems of FIGS. 1-3 may provide two levels of sub lighting array degradation indication. Further, current flow through sub lighting array 215 may be increased to compensate for lower levels of LED intensity that may be related to short circuiting current flowing in a LED.

Figure 7A:
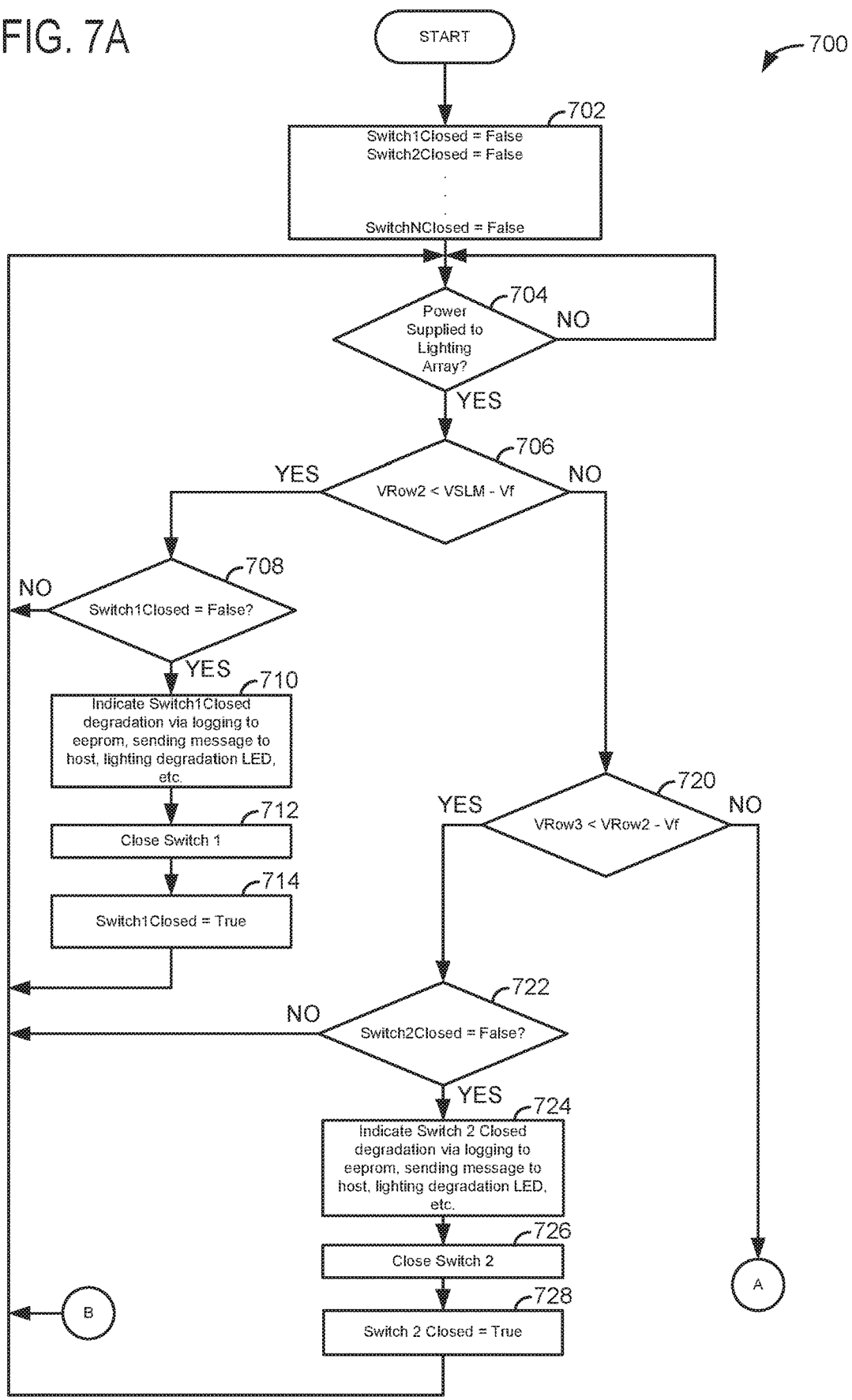

Referring now to FIGS. 7A and 7B, a second method for controlling a lighting array is shown. The method of FIGS. 7A and 7B may be stored as executable instructions in non-transitory memory in systems such as shown in FIGS. 1-3. The method of FIG. 7 may be incorporated into and may cooperate with the systems of FIGS. 1-3. Further, at least portions of the method of FIGS. 7A and 7B may be incorporated as executable instructions stored in non-transitory memory while other portions of the method may be performed via a controller transforming operating states of devices and actuators in the physical world. Method 700 shows logic for three rows of LEDs as shown in FIG. 3 (N=3), but the logic of method 700 may be extended to accommodate lighting arrays with greater than three rows of LEDs. The method of 7A and 7B may be performed simultaneously or in conjunction with the method of FIG. 4.

Method 700 determines whether or not a row of LEDs in sub lighting array 215 is in an open circuit condition (e.g., zero current flow through the row of LEDs). If a row is in an open circuit condition, the row may be bypassed by closing a switch that is associated with the row so that voltage may be applied to rows that are not in an open circuit condition. In this way, method 700 may activate LEDs in rows that are not in an open circuit condition even when a row is in an open circuit condition so that the sub lighting array 215 may continue to operate.

At 702, method 700 adjusts values of variables stored in controller RAM that represent operating states (e.g., open or closed) of switches that may bypass voltage and current around rows in a sub lighting array 215 (e.g., switches 330-332 in FIG. 3). The sub lighting array 215 may include N rows of LEDs and N switches to selectively bypass the N rows of LEDs. Each variable that represents a state of a switch is adjusted to a false state, which indicates that the respective switch is open and not closed so that its associated array row is not bypassed. Method 700 adjusts the value of each switch variable from variable Switch1Closed to SwitchNClosed to false. Method 700 proceeds to 704.

At 704, method 700 judges if electric power is supplied to one or more sub lighting arrays 215. Method 700 may judge that electric power is supplied to one or more sub lighting arrays 215 when driver 255 and power supply 102 are activated. In still other examples, method 700 may judge that electric power is supplied to one or more sub lighting arrays 215 based on whether or not a predetermined voltage is applied to a first row of LEDs in one or more sub lighting arrays 215. Driver 255 adjusts a voltage applied to node 236 of FIG. 3 in response to a voltage measured at node 235 of FIG. 3. For example, if it is desired to have 3 volts at node 235, driver 255 increases or decreases voltage applied to node 236 to achieve 3 volts at node 235. The desired voltage at node 235 may be based on the actual total number of rows in the sub lighting array 215. If method 700 judges that electric power is supplied to one or more sub lighting arrays 215, the answer is yes and method 700 proceeds to 706. Otherwise, the answer is no and method 700 returns to 704.

At 706, method 700 judges if a voltage VSLM−Vf is greater than voltage VRow2, where VSLM is a voltage applied to the sub lighting array 215 at node 236 shown in FIG. 3 by driver 255, Vf is a forward voltage of LEDs in the sub lighting array 215, and VRow2 is a voltage applied to LEDs in the second row of the sub lighting array 215 (e.g., a voltage at bus 261). If so, the answer is yes and method 700 proceeds to 708. Otherwise, the answer is no and method 700 proceeds to 720. If the voltage of sub lighting array row number two is less than the voltage applied to the sub lighting array 215 minus the forward LED voltage, an open circuit condition for row 1 is indicated. In some examples, if VSLM−Vf is greater than voltage VRow2, method 700 may further require that current flow through sub lighting array 215 is less than a threshold current before method 700 is allowed to proceed to 708. Otherwise, method 700 will proceed to 720. By verifying that current flow through sub lighting array 215 is less than a threshold, an additional level of verification that an open circuit condition exists at row number one may be provided before switch number one (330) is closed. The added level of verification may be useful if there is an unexpected voltage change in the system, such as Vf deviating from an expected value.

At 708, method 700 judges if the variable Switch1Closed is false. If not, method 700 returns to 704. Otherwise, the answer is yes and method 700 proceeds to 710.

At 710, method 700 indicates that an open circuit condition is present in row number one of the sub lighting array 215. Method 700 may also indicate that switch number one (330) that selectively bypasses row number one of the sub lighting array 215 is closed. In one example, method 700 writes a value (e.g., 1) to a location in EEPROM to indicate the open circuit condition is present in row number one of sub lighting array 215. This indication may be referred to as an indication of degradation. Alternatively, or in addition, method 700 may send a variable to a host computer via a LAN, internet, or other medium to indicate that there is an open circuit condition in row number one of sub lighting array 215. Additionally, method 700 may provide an indication of lighting array degradation via illuminating a LED or modifying a value presented on a human/machine interface. Further, in some examples, current flow to the sub lighting array 215 may be increased to compensate for reduced light energy from array rows exhibiting an open circuit condition. In still other examples, current flow to sub lighting array 215 may be ceased after an open circuit condition is detected and a present lighting cycle is complete so that mitigating actions may be taken. Method 700 proceeds to 712.

At 712, method 700 closes switch number one (330) that selectively bypasses LEDs in the first row of the sub lighting array 215. By closing switch number one, voltage applied to LEDs in the first row of the sub lighting array 215 may be applied to LEDs in the second row of sub lighting array 215 so that current may flow to LEDs in the rows below (e.g., rows two and three) the first row of sub lighting array 215. This action may allow sub lighting array 215 to continue to operate and reduce the possibility of machine down time. Method 700 proceeds to 714.

At 714, method 700 adjusts the value of variable Switch1Closed to true. Method 700 then returns to 704.

At 720, method 700 judges if a voltage VRow2−Vf is greater than voltage VRow3, where VRow2 is a voltage applied to LEDs in the second row of sub lighting array 215 (e.g., a voltage at bus 261), Vf is a forward voltage of LEDs in the sub lighting array 215, and VRow3 is a voltage applied to LEDs in the third row of sub lighting array 215 (e.g., a voltage at bus 262). If so, the answer is yes and method 700 proceeds to 722. Otherwise, the answer is no and method 700 proceeds to 730. If the voltage of row number three is less than the voltage applied to the sub lighting array minus the forward LED voltage, an open circuit condition is indicated for row number two LEDs. In some examples, if VRow2−Vf is greater than voltage VRow3, method 700 may further require that current flow through sub lighting array 215 is less than a threshold current before method 700 is allowed to proceed to 722. Otherwise, method 700 will proceed to 730. By verifying that current flow through sub lighting array 215 is less than a threshold, an additional level of verification that an open circuit condition exists at row number two may be provided before switch number two (331) is closed. The added level of verification may be useful if there is an unexpected voltage change in the system, such as Vf deviating from an expected value.

At 722, method 700 judges if the variable Switch2Closed is false. If not, the answer is no and method 700 returns to 704. Otherwise, the answer is yes and method 700 proceeds to 724.

At 724, method 700 indicates that an open circuit condition is present in row number two of the sub lighting array 215. Method 700 may also indicate that switch number two (331) of row number two of the sub lighting array 215 is closed. In one example, method 700 writes a value (e.g., 2) to a location in EEPROM to indicate that an open circuit condition is present in row number two of sub lighting array 215. This indication may be referred to as an indication of degradation. Alternatively, or in addition, method 700 may send a variable to a host computer via a LAN, internet, or other medium to indicate that there is an open circuit condition in row two of sub lighting array 215. Additionally, method 700 may provide an indication of lighting array degradation via illuminating a LED or modifying a value presented on a human/machine interface. Further, in some examples, current flow to the sub lighting array 215 may be increased to compensate for reduced light energy from sub lighting array rows exhibiting an open circuit condition. In still other examples, current flow to sub lighting array 215 may be ceased after a present lighting cycle is complete so that mitigating actions may be taken. Method 700 proceeds to 726.

At 726, method 700 closes switch number two (331) that selectively bypasses LEDs in the second row of the sub lighting array 215. By closing switch number 2 (331), voltage applied to LEDs in the second row of the sub lighting array 215 may be applied to LEDs in the third row of sub lighting array 215 so that rows below row number two may receive voltage and continue to operate even in the presence of an open circuit condition in sub lighting array 215. Method 700 proceeds to 728.

At 728, method 700 adjusts the value of variable Switch2Closed to true. Method 700 then returns to 704.

At 730, method 700 judges if a voltage VRowN−Vf is greater than voltage $V_{235}$, where VRowN is a voltage applied to LEDs in the third row of sub lighting array 215 (e.g., a voltage at bus 262) since N=3 in this example, Vf is a forward voltage of LEDs in the sub lighting array 215, and $V_{235}$ is a voltage at cathodes of LEDs in the last row of LEDs (e.g., in this example LEDS in the third row) of sub lighting array 215 (e.g., a voltage at node 235 of FIG. 3). If so, the answer is yes and method 700 proceeds to 732. Otherwise, the answer is no and method 700 returns to 704. If the voltage at cathodes of LEDs in row number N is less than the voltage applied anodes of LEDs in the Nth row of the sub lighting array minus the forward LED voltage, an open circuit condition is indicated for row N LEDs. In some examples, if VRowN−Vf is greater than voltage $V_{235}$, method 700 may further require that current flow through sub lighting array 215 is less than a threshold current before method 700 is allowed to proceed to 732. Otherwise, method 700 will return to 704. By verifying that current flow through sub lighting array 215 is less than a threshold, an additional level of verification that an open circuit condition exists at row number three (N) may be provided before switch number three (N) (332) is closed. The added level of verification may be useful if there is an unexpected voltage change in the system, such as Vf deviating from an expected value.

At 732, method 700 judges if the variable SwitchNClosed is false. If not, the answer is no method 700 returns to 704. Otherwise, the answer is yes and method 700 proceeds to 734.

At 734, method 700 indicates that an open circuit condition is present in row number N of the sub lighting array 215. Method 700 may also indicate that the switch number three (332), which selectively bypasses row number three (N) of the sub lighting array 215 is closed. In one example, method 700 writes a value (e.g., N in this case 3) to a location in EEPROM to indicate an open circuit condition is present in row N of sub lighting array 215. This indication may be referred to as an indication of degradation. Further, the value identifies the sub lighting array row that includes an open circuit. Alternatively, or in addition, method 700 may send a variable to a host computer via a LAN, internet, or other medium to indicate that there is an open circuit present in a row of the sub lighting array 215. Additionally, method 700 may provide an indication of lighting array degradation via illuminating a LED or modifying a value presented on a human/machine interface. Further, in some examples, current flow to sub lighting array 215 may be increased to compensate for reduced light energy from array rows exhibiting an open circuit condition. In still other examples, current flow to sub lighting array 215 may be ceased after a present lighting cycle is complete so that mitigating actions may be taken. Method 700 proceeds to 736.

At 736, method 700 closes switch number three (332) that selectively bypasses LEDs in the third (Nth) row of the sub lighting array 215. By closing switch number three, voltage applied to LEDs in the third (Nth) row of sub lighting array 215 may be applied to the variable resistor 230 in FIG. 3 so that lighting circuit continuity is present and so that LEDs that are not bypassed may illuminate. Method 700 proceeds to 738.

At 738, method 700 adjusts the value of variable SwitchNClosed to true. Method 700 then returns to 704.

In this way, an open circuit condition in a row of LEDs may be detected and the individual row exhibiting the open circuit condition may be identified and reported or indicated to humans or supervisory machines (e.g., a host computer). The human operators or supervisory machines may then take mitigating actions to resolve the degradation.

The methods of FIGS. 4 and 7A-7B provide for a method for operating light emitting devices, comprising: receiving inputs to a controller; and providing an indication of lighting system degradation in response to short circuiting current flowing through one or more light emitting devices in an array of light emitting devices, the array of light emitting devices including N rows of light emitting devices and M columns of light emitting devices. The method includes where the short circuiting current is based on a voltage of a circuit controlling current flow through the array of light emitting devices. The voltage may result from the presence of the short circuiting current. The method includes where the circuit includes a driver, the array of light emitting devices, a variable resistor, a fixed resistor, and a controller. The method also includes where the indication includes writing a value to EEPROM memory or lighting a light emitting device. The method includes where the indication includes sending data to a host computer.

In some examples, the method further comprises increasing current flow through the array of light emitting devices in response to the short circuiting current flowing through the one or more light emitting devices. The method further comprises ceasing current flow through the array of light emitting devices in response to the short circuiting current flowing through the one or more light emitting devices. The method further comprises identifying a row in which the short circuiting current flows and providing an indication of the row. The method further comprises closing a switch to selectively bypass a row of the array of light emitting devices in response to a voltage indicating an open circuit in the row of the array of light emitting devices. The method further comprises adjusting a voltage output of a driver in response to the short circuit current flowing through the one or more light emitting devices.

Figure 8:
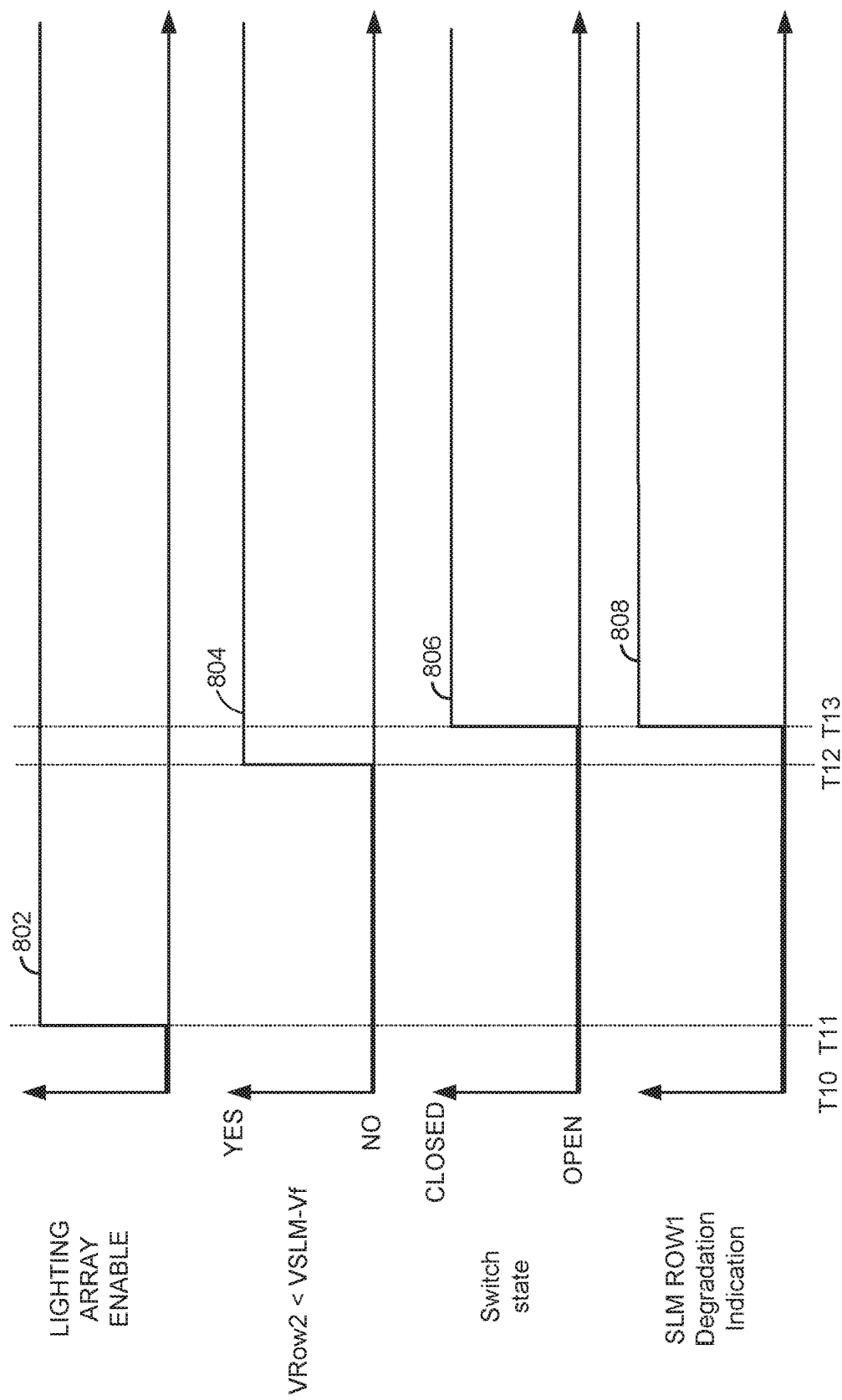
FIG. 8 shows an example lighting array operating sequence according to the method of FIG. 7.

Referring now to FIG. 8, example prophetic lighting array operating sequence is shown. FIG. 8 shows four plots that are time aligned and that occur at a same time. Vertical markers at times T10-T13 represent times of interest. The sequences of FIG. 8 may be provided by the method of FIGS. 7A-7B and the system shown in FIGS. 1 and 3.

The first plot from the top of FIG. 8 is a plot of a sub lighting array enable or activation request versus time. The sub lighting array activation request may be provided by a host computer or human. The vertical axis represents a voltage level of the sub lighting array enable signal and the voltage level increases from the horizontal axis. The sub lighting array is requested to be enabled and activated when trace 802 is at a higher level. The sub lighting array is requested off and deactivated when the trace is at a lower level. The horizontal axis represents time and time increases from the left side of the figure to the right side of the figure.

The second plot from the top of FIG. 8 the state of condition VRow2<VSLM-Vf, which is a basis for judging if an open circuit condition is detected in row number one of the sub lighting array 215. The vertical axis represents state of condition VRow2<VSLM-Vf and condition VRow2<VSLM-Vf is true when trace 804 is at a higher level near the vertical axis arrow. Trace 804 is at a lower level near the horizontal axis when condition VRow2<VSLM-Vf is false. The horizontal axis represents time and time increases from the left side of FIG. 8 to the right side of FIG. 8.

The third plot from the top of FIG. 8 is a plot of operating state for switch number one (e.g., switch 330 in FIG. 3), which may selectively bypass LEDs in row number one of the sub lighting array 215 when an open circuit in row number one is detected via a system voltage. The vertical axis represents switch number one (330) operating state and switch number one (330) is closed when trace 806 is at a higher level near the vertical axis arrow. Switch number one operating state is open when trace 806 is at a lower level near the horizontal axis.

The fourth plot from the top of FIG. 8 is a plot of sub lighting array row 1 degradation state versus time. The vertical axis represents sub lighting array degradation state. Degradation is indicated when trace 808 is at a higher level near the vertical axis arrow. Degradation is not indicated when trace 808 is at a lower level near the horizontal axis.

At time T10, the sub lighting array is off as indicated by the sub lighting array enable trace 802 not being asserted or not being at a higher level. The condition VRow2<VSLM-Vf is not true, the switch number one (330) is open, and sub lighting array degradation is not indicated.

At time T11, the sub lighting array is commanded on as indicated by the sub lighting array enable trace 802 being asserted and at a higher level. The condition VRow2<VSLM-Vf is not true, switch number one (330) is open, and sub lighting array degradation is not indicated.

At time T12, the sub lighting array remains activated and condition VRow2<VSLM-Vf changes state from not being true to being true. The state of the switch number one (330) is changed from open to closed in response to the condition VRow2<VSLM-Vf being true at time T13. Further, sub lighting array degradation is indicated in response to the condition VRow2<VSLM-Vf being true at time T13.

In this way, sub lighting array row open circuit conditions may be determined and indicated for individual rows of LEDs in a sub lighting array. Further, mitigating actions may be take via closing individual switches to bypass voltage and current around rows of LEDs where an open circuit condition is present.

As will be appreciated by one of ordinary skill in the art, the method described in FIGS. 4 and 7A-7B may be performed via the circuitry described herein. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular circuitry being used.

This concludes the description. The reading of it by those skilled in the art would bring to mind many alterations and modifications without departing from the spirit and the scope of the description. For example, lighting sources producing different wavelengths of light may take advantage of the present description.

The invention claimed is:

1. A system for operating light emitting devices, comprising:
   an array of solid state lighting devices;
   a circuit controlling electric current flow through the array of solid state lighting devices; and
   a controller including executable instructions stored in non-transitory memory to:
   while electric power is supplied to the array,
   provide an indication of a first level of degradation in a solid state device included in the array of solid state lighting devices responsive to a baseline voltage minus a voltage of the circuit controlling electric current flow through the array of solid state lighting devices being less than a predetermined voltage, and an indication of a second level of degradation in the solid state device included in the array of solid state lighting devices responsive to the baseline voltage minus the voltage of the circuit controlling electric current flow through the array of solid state lighting devices being greater than the predetermined voltage, wherein the second level of degradation is a higher level of degradation than the first level of degradation.

2. The system of claim 1, where the indication is writing a variable to EEPROM memory, and the first level of degradation includes a first level of short circuiting current that reduces a lighting intensity of the array of solid state lighting devices by a first threshold amount, and the second level of degradation includes a second level of short circuiting current that reduces the lighting intensity of the array of solid state lighting devices by a second threshold amount, higher than the first threshold amount.

3. The system of claim 1, where the voltage is a voltage applied to a first row of solid state lighting devices in the array of solid state lighting devices.

4. The system of claim 1, where the voltage is a voltage applied to a variable resistor in the circuit controlling electric current flow through the array of solid state lighting devices.

5. The system of claim 1, further comprising a driver that supplies a voltage to the array of solid state lighting devices.

6. The system of claim 5, where the voltage is responsive to a voltage applied to a variable resistor.

7. The system of claim 1, further comprising additional instructions to increase current flow through the array of solid state lighting devices in response to the voltage of the circuit controlling electric current flow through the array of solid state lighting devices.

8. The system of claim 7, where the circuit controlling electric current flow through the array of solid state lighting devices includes a driver, the array of solid state lighting devices, a variable resistor, and a fixed resistor.

9. A system for operating light emitting devices, comprising:
an array of solid state lighting devices including N rows of solid state lighting devices and M columns of solid state lighting devices, wherein M and N each have a value higher than 1, wherein anodes of individual solid state lighting devices in each of the N rows are electrically coupled to other individual solid state lighting devices of a corresponding row, and cathodes of the individual solid state lighting devices in each of the N rows are electrically coupled to the other individual solid state lighting devices of the corresponding row;
N switches for selectively bypassing the N rows in the array of solid state lighting devices;
a circuit controlling electric current flow through the array of solid state lighting devices; and
a controller including executable instructions stored in non-transitory memory to:
responsive to a voltage of the circuit controlling electric current flow through the array of solid state lighting devices,
close one of the N switches for a given row to cause the current flow to bypass all of the individual solid state lighting devices of the given row, and transfer to a row immediately after the given row; and
provide an indication of a presence of an open circuit in one or more of the individual solid state lighting devices of the given row in the array of solid state lighting devices, the closing of one of the N switches causing the current flow to bypass all the individual solid state lighting devices of the given row.

10. The system of claim 9, further comprising N conductors for sensing voltage at each of the N rows of solid state lighting devices, and wherein the current flow bypassing all the individual solid state lighting devices of the given row includes the current flow being transferred from a row immediately before the given row with the open circuit to another row immediately after the given row.

11. A method for operating light emitting devices, comprising:
while electric power is supplied to an array of the light emitting devices,
receiving inputs to a controller; and
providing an indication of a first level of lighting system degradation via the controller in response to a difference between a baseline voltage and a voltage of a circuit current flow through one or more light emitting devices in the array of light emitting devices being lower than a predetermined voltage, and an indication of a second level of lighting system degradation in response to the difference between the baseline voltage and the voltage of the circuit current flow through the one or more light emitting devices being greater than the predetermined voltage, the array of light emitting devices including N rows of light emitting devices and M columns of light emitting devices, and the second level of lighting system degradation being higher than the first level of lighting system degradation.

12. The method of claim 11, where a short circuiting current is present based on the voltage of the circuit current flow through one or more light emitting devices in the array of light emitting devices.

13. The method of claim 12, where the circuit current flow includes a driver, the array of light emitting devices, a variable resistor, a fixed resistor, and the controller.

14. The method of claim 11, where the indication includes writing a value to EEPROM memory or lighting a light emitting device.

15. The method of claim 11, where the indication includes sending data to a host computer.

16. The method of claim 12, further comprising increasing current flow through the array of light emitting devices in response to the circuit current flow through the one or more light emitting devices.

17. The method of claim 12, further comprising ceasing current flow through the array of light emitting devices in response to the circuit current flow through the one or more light emitting devices.

18. The method of claim 12, further comprising identifying a row in which the circuit current flows and providing an indication of the row.

19. The method of claim 11, further comprising closing a switch to selectively bypass a row of the array of light emitting devices in response to a voltage indicating an open circuit in the row of the array of light emitting devices.

20. The method of claim 12, further comprising adjusting a voltage output of a driver in response to the circuit current flow through the one or more light emitting devices.

* * * * *